C. VON HOFE.
BASE LINE TELEMETER.
APPLICATION FILED NOV. 4, 1911.
1,060,902.
Patented May 6, 1913.
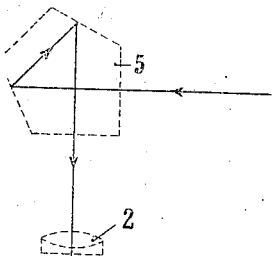
Fig. 1.
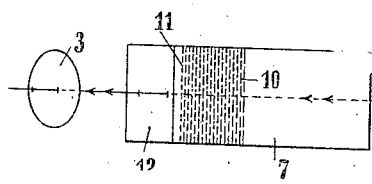
Fig. 3.
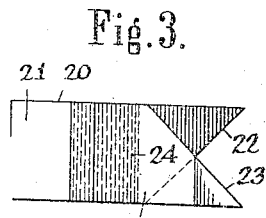
Fig. 5.
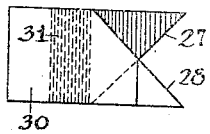
Fig. 4.
Fig. 2.
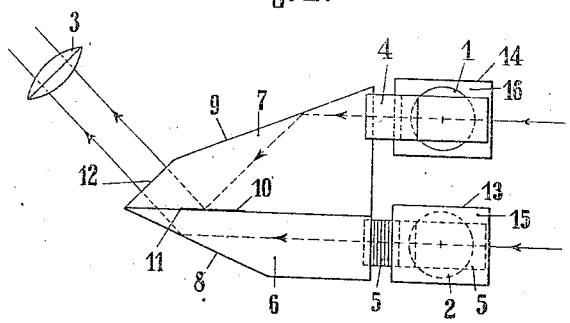
Fig. 6.
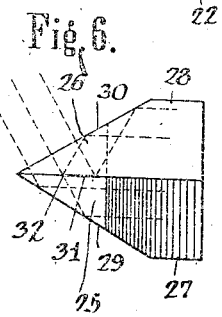

UNITED STATES PATENT OFFICE.

CHRISTIAN von HOFE, OF WILMERSDORF, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

BASE-LINE TELEMETER.

1,060,902.  Specification of Letters Patent.  Patented May 6, 1913.

Application filed November 4, 1911. Serial No. 658,475.

*To all whom it may concern:*

Be it known that I, CHRISTIAN VON HOFE, a citizen of the German Empire, and resident of Wilmersdorf, near Berlin, Germany, have invented certain new and useful Improvements in Base-Line Telemeters, of which the following is a specification.

This invention relates to base line telemeters provided with a compound ocular prism device for uniting the images of distant objects produced from the ends of the base line of the instrument having a reflecting layer in a contacting surface of prisms of the ocular prism device.

More particularly the invention relates to base line telemeters of the said kind where the edge of the reflecting layer provided in the contact surface of the ocular prism device is arranged in a common focal plane of the two objectives parallel to the plane of the measuring triangle and at right angles to the axis of the rays which penetrate that part of the contact surface of the ocular prism device which is not provided with the said reflecting layer.

The invention consists in such a construction of the ocular prism device of instruments referred to that a direction of view for the observer is obtained which is inclined to the plane of the triangle of observation, this allowing in many cases a more comfortable observing position than a direction of observation parallel to the plane of the measuring triangle.

Three embodiments of the new ocular prism device are represented on the accompanying drawings.

Figure 1 shows a plan of the new ocular prism device the principal optical elements of the telemeter being at the same time indicated diagrammatically by dotted lines. Fig. 2 shows a lateral view of the ocular prism device of Fig. 1 and the said principal optical elements of the telemeter. Figs. 3 and 4 and 5 and 6 respectively show two modified forms of the new ocular prism device.

Referring more particularly to Figs. 1 and 2 of the drawings the two objectives of the telemeter are designated 1, 2 and the ocular 3. The penta prisms arranged in front of the objectives 1, 2 are indicated at 4 and 5. The ocular prism device consists of the compound ocular prism proper composed of the prisms 6, 7 and of two deviating prisms 13, 14 adapted to receive the rays coming from the objectives and throwing same to the ocular prism proper. The compound ocular prism proper is provided with two reflecting surfaces 8, 9 converging toward each other. A reflecting layer 10 is provided in the contacting surface of the prisms 6, 7, said reflecting layer having an edge 11 forming the horizontal line of division in the image field of the instrument. 12 designates the exit surface of the compound ocular prism which is arranged inclined to the plane of the measuring triangle and at right angles to the axis of the ocular. The deviating prisms 13, 14 are provided with crossing reflecting surfaces 15, 16.

The operation of the device is as follows: Rays coming from an object, the distance of which is to be measured, are reflected by the surfaces of the penta prisms 4, 5 and thrown into the objectives 1, 2 whereafter they impinge on the surfaces 15, 16 of the deviating prisms 13, 14. The reflecting surface 15 of the prism 13 reflects the rays to the surface 8 of prism 6 where they are reflected in a direction perpendicularly to the exit surface 12 so that these rays are thrown directly into the ocular 3. The rays coming from the objective 1 impinge on the surface 16 which reflects them to the surface 9 where they receive a further reflection whereby they are thrown on the reflecting layer 10. The reflecting layer 10 reflects the rays in a direction perpendicularly to the exit surface 12 into the ocular. It appears from the foregoing description that the edge 11 of the reflecting layer 10 forms a line of division in the field of view as above stated which is positioned horizontally and appears sharp in its whole length according to its being positioned in a common focal plane of the objectives. The rays passing through the objective 2 enter the ocular after having been four times reflected namely twice by surfaces of the penta prism 5, once by the surface 15 and once by the surface 8. The image produced by the rays passing through objective 2 therefore appears upright and rightsided. The rays coming from objective 1 are reflected five times namely twice by surfaces of penta prism 4, once by reflecting surface 16 of prism 14, once by reflecting surface 9 of prism 7 and once by reflecting layer 10. The image of the objects produced by objective 1 therefore appears inverted so that the base line telemeter with the prism ocular device of Fig. 1 operates as a so-called invert base line telemeter. In order to make it a so-called coincidence telemeter it would be necessary to provide an even number of reflections also for the rays passing through objective 1.

The ocular prism device illustrated in Figs. 3 and 4 is distinguished from the device of Figs. 1 and 2 by combining prisms 13 and 14 with prisms 6 and 7 respectively to prisms 18 and 19 and by providing the exit surface of the rays coming from objective 1 on a special prism 20 cemented together with prism 19. Said exit surface of prism 20 is in this instance designated 21 and the crossing reflecting surfaces of prisms 18, 19, are designated 22, 23; the reflecting layer in the contact surface of prisms 18, 19 is designated 24.

In the embodiment of the ocular prism device illustrated in Figs. 5 and 6 the inclinations of the reflecting surfaces of the two prisms forming the ocular prism toward the reflecting layer in their contact surface are so calculated that the exit surface for the rays coincides with one reflecting surface of the ocular prism so that a special exit surface is dispensed with. The two elements of the compound ocular prism are designated 25, 26; same are provided each with a reflecting surface 27, 28, these two surfaces cross each other and correspond in their function to the surfaces 22, 23 of Figs. 3 and 4 and to surfaces 15, 16 of Figs. 1 and 2. Surface 29 of prism 25 corresponds to surface 8 of prism 6 in Fig. 2 and surface 30 of prism 26 to both the surfaces 9 and 12 of prism 7 in Fig. 2. 31 is the reflecting layer in the contact surface of prisms 25, 26 and 32 its limiting edge.

What I claim is:—

In a base line telemeter in combination with two objectives and one ocular an ocular prism device comprising two prisms contacting with each other in a surface crossing the field of view of the ocular, a reflecting layer provided in a part of said contact surface and having a limiting edge arranged parallel to the plane of the measuring triangle and at right angles to the axis of the rays which penetrate that part of said contact surface which is not provided with the reflecting layer, the prisms of the ocular prism device contacting with said reflecting layer being provided with reflecting surfaces converging toward each other and including the reflecting layer within the angular space formed by them, reflecting means adapted to throw the rays coming from said two objectives on said converging reflecting surfaces of the ocular prism device and an exit surface provided at the ocular prism device said exit surface crossing the path of the rays coming from said two converging prism surfaces and advancing toward the ocular and arranged at right angles both to the rays reflected from one of said two converging surfaces of the ocular prism and to the rays reflected from the reflecting layer after reflection from the second of said two converging prism surfaces.

In testimony whereof I have signed this specification in the presence of two subscribing witnesses.

CHRISTIAN von HOFE.

Witnesses:
WOLDEMAR HAUPT
HENRY HASPER.